US006975633B1

(12) United States Patent
T'Joens

(10) Patent No.: US 6,975,633 B1
(45) Date of Patent: Dec. 13, 2005

(54) COMMUNICATIONS NETWORK FOR EXCHANGING DATA PACKETS OF ATM CONNECTIONS AND METHODS AND NETWORK NODES FOR THIS COMMUNICATIONS NETWORK

(75) Inventor: Yves T'Joens, Sint Michiels-Brugge (BE)

(73) Assignee: Alcatel, Paris (FR)

( * ) Notice: Subject to any disclaimer, the term of this patent is extended or adjusted under 35 U.S.C. 154(b) by 839 days.

(21) Appl. No.: 09/689,857

(22) Filed: Oct. 13, 2000

(30) Foreign Application Priority Data

Oct. 15, 1999 (EP) .................................. 99440277

(51) Int. Cl.[7] .............................................. H04L 12/28

(52) U.S. Cl. ...................................... 370/401; 370/408

(58) Field of Search ............................ 370/395.1, 256, 370/401, 408

(56) References Cited

U.S. PATENT DOCUMENTS

| | | | | |
|---|---|---|---|---|
| 5,831,975 | A * | 11/1998 | Chen et al. | 370/256 |
| 6,115,753 | A * | 9/2000 | Joens | 709/242 |
| 6,456,600 | B1 * | 9/2002 | Rochberger et al. | 370/255 |
| 6,470,022 | B1 * | 10/2002 | Rochberger | 370/437 |
| 6,473,408 | B1 * | 10/2002 | Rochberger et al. | 370/255 |
| 6,614,762 | B1 * | 9/2003 | Illiadis et al. | 370/252 |
| 6,690,653 | B1 * | 2/2004 | Anbiah et al. | 370/256 |

FOREIGN PATENT DOCUMENTS

| | | |
|---|---|---|
| EP | 0 426 599 A2 | 5/1991 |
| EP | 0 926 922 A2 | 6/1999 |
| WO | WO 99/45740 | 9/1999 |

OTHER PUBLICATIONS

U. Black: "ATM, vol. II Signaling in broadband networks" Prentice Hall Series in Advances Communications Technologies, US, Upper Saddle River, NJ: Prentice Hall, 1998, pp. 159-179, XP002080340 ISBN: 0-13-571837-6.

* cited by examiner

*Primary Examiner*—Chi Pham
*Assistant Examiner*—Blanche Wong
(74) *Attorney, Agent, or Firm*—Sughrue Mion, PLLC

(57) ABSTRACT

The invention relates to a communications network for exchanging data packets of ATM connections in which, in network nodes of a lower network level, a data bank is provided in which connection data are kept available, wherein each data bank in a network node of a lower network level (L1) keeps available connection data for a closer environment (PGA1, . . . , PGA4, . . . , PGC), that at least one additional data bank (RSA1, . . . , RSC), which keeps available connection data for a wider environment, is provided and assigned to a network node, and that network node of a higher network level (e.g. A.1) which is responsible for a network node (A.1.1) to which an additional data bank (RSA1) is assigned, also comprises means for maintaining the connection data in this additional data bank, and a method for making available connection data and a method for determining path information in such a communications network, network nodes for a lower network level, and a network node for a higher network level of this communications network.

8 Claims, 2 Drawing Sheets

COMMUNICATIONS NETWORK FOR EXCHANGING DATA PACKETS OF ATM CONNECTIONS AND METHODS AND NETWORK NODES FOR THIS COMMUNICATIONS NETWORK

BACKGROUND OF THE INVENTION

The invention relates to a communications network for exchanging data packets of ATM connections, a method for making available connection data, a method for determining path information, a network node for a lower network level, and a network node for a higher network level.

A communications network of the type to which the present invention is directed is currently associated with the designation PNNI. A frequently found version of this abbreviation is "private network network interface". However, the use of such networks is now in no way limited to private networks. An important application of such networks is in the context of the Internet.

Such a communications network is generally physically identical to a part of the global communications network via which for example telephone calls are also conducted; however it may be logically distinct therefrom.

In such a communications network, data are transferred in the form of packets, a packet head of each data packet containing an item of path information with the aid of which it is routed through the communications network. This path information is acquired in a source network node from the destination information relating to a destination network node. The source network node is the network node at which the particular data packet enters this communications network, while the destination network node is the network node at which the particular data packet exits from the communications network. The path information must clearly define a path so that data packets with the same path information must also take the same path. However, the path information need not necessarily contain, in each subsection of the path, all the detailed information for the entire path, but can be redefined en route for the particular next larger section.

In order always to be able to define the path information for the entire path actually in the source network node, every network node which can constitute a source network node must be able to access the connection data for the whole of the communications network. In known communications networks of this kind, this occurs in that each network node of the lowest network level contains a data bank in which connection data for the whole of the communications network are stored. The larger such a communications network becomes, the larger each individual data bank must be; the maintenance of the data is also problematic.

SUMMARY OF THE INVENTION

The object of the invention is to design the communications network so as to reduce the outlay therein for making available connection data and for determining path information. It is a further object of the invention to provide methods and network nodes for this purpose.

This object is achieved in accordance with the invention by a communications network, a process for making available connection data, a process for determining path information, a network node for a lower network, and a network node for a higher network level.

This object is achieved according to the invention by a communications network for exchanging data packets of ATM connections, which is hierarchically constructed to include:

- a plurality of network nodes in a lowest network level, the nodes being in each case directly or indirectly connected, by at least one possible physical path, on the one hand to terminal devices and on the other hand to every other network node of the same network level,
- a plurality of network nodes in a higher network levels, which are in each case administratively responsible for a peer group of network nodes situated in an underlying network level, each network node situated in a higher network level being physically connected to at least one network node of the group for which it is responsible and being logically connected to every other network node of this group and to every other network node of the group to which it itself belongs, each network node of a higher network level being responsible for providing that each network node of a lower network level for which it is responsible can when necessary use the connection data which it requires to determine the path information for the data packets of a concrete ATM connection in this communications network, and
- said communications network further including a data bank (DB), in which connection data are kept available, arranged in network nodes of a lower network level, each data bank in a network node of a lower network level keeping available connection data for a closer environment, with at least one additional data bank, which keeps available connection data for a wider environment, being provided and assigned to a network node, with the network node of a higher network level which is responsible for a network node to which an additional data bank is assigned also comprising means for maintaining the connection data in this additional data bank.

The object of the invention is further attained by a process for making available connection data for determining path information for the data packets of ATM connections in such a communications network.

The object of the invention is still further attained by a process for determining path information for the data packets of ATM connections in a network node of such a communications network, wherein connection data are called up from a data bank assigned to a network node of the lower network level, and wherein the connection data which cannot be called up from the data bank assigned to the network node are called up from an additional data bank which is assigned to another network node.

The object of the invention is still further attained by network nodes for a lower network level of such a communications network, wherein the data bank keeps available connection data for a closer environment and the network node comprises interrogation means by which the connection data for a wider environment can be called up from an additional data bank which is assigned to another network node.

The object of the invention is yet further attained by a network node for a lower network level of such a communications network, wherein the lower level network node to which the additional data bank is assigned comprises means whereby connection data from the additional data bank can be emitted to other network nodes upon request.

Finally, the object of the invention is attained by network nodes for a higher network level of such a communications network, wherein the network node comprises means for supporting the exchange of connection data between data banks in network nodes for which this network node is responsible and data banks in other network nodes for maintaining the respective stored data.

Further developments of the invention are disclosed in the sub-claims and in the following description.

BRIEF DESCRIPTION OF THE DRAWINGS

In the following the invention will be explained further making reference to the attached drawings wherein.

DETAILED DESCRIPTION OF THE INVENTION

Figure 1:
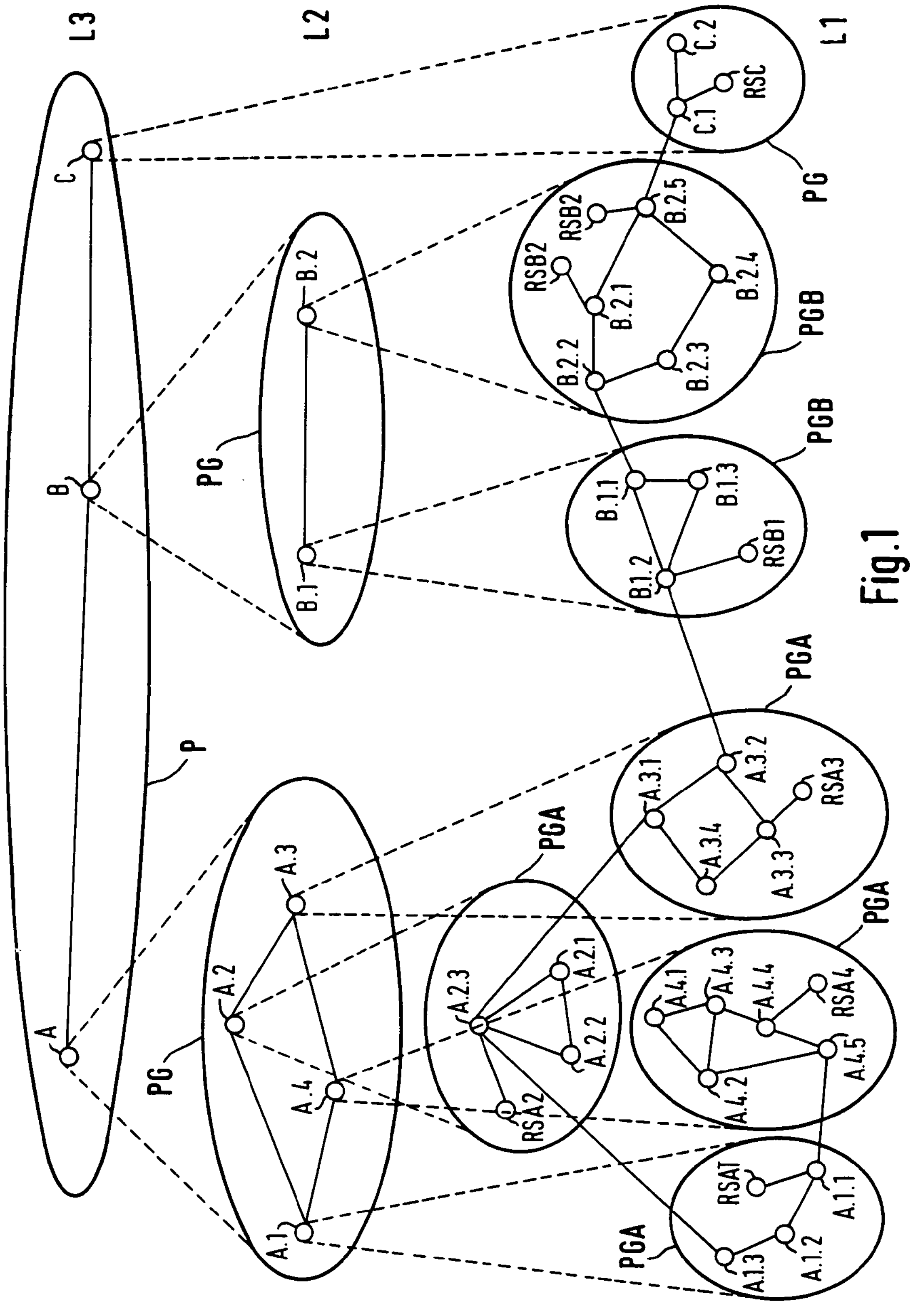
FIG. 1 illustrates an example for a communications network according to the invention and FIG. 2 illustrates an example for a network node according to the invention.

The starting point will firstly be described with reference to FIG. 1:

A plurality of network nodes A.1.1, . . . , C.2 are arranged in a network level L1. These network nodes are combined to form groups PGA1, . . . , PGC (known as peer groups). The network nodes are connected to one another by physical connections such that individual pairs of network nodes, for example A.1.1 and A.1.2 or A.1.1 and A.4.5, are directly connected to one another while other pairs of network nodes are interconnectible only via the intermediary of at least one further network node. At least in this indirect manner, every network node can be connected to every other network node. In part, alternative paths are also possible. In FIG. 1 these connections have been represented by continuous lines; for reasons of clarity however, they have not been provided with reference symbols.

A higher network level L2 comprises further network nodes A.1, . . . , B.2 which each are administratively responsible for one of the lower groups. These network nodes are again combined to form groups PGA and PGB. Above this level is arranged a third network level L3 comprising further network nodes A, B and C. These are combined in a group PG. Broken lines represent the regions of responsibility of network nodes in higher network levels for network nodes in lower network levels.

The division of the network nodes, or conversely the combining of the network nodes, to form groups takes place in accordance with principles which are of no further significance here. Therefore it can readily occur that the network node C of the uppermost network level L3 is responsible only for two network nodes C.1 and C.2 in the lowest network level L1 without the presence of an intervening network node or entire group of network nodes in the network level L2.

Although not shown here, a network node of a higher network level must of course be able to establish contact at least with those network nodes in lower network levels for which it is administratively responsible. For this purpose it is physically connected to at least one network node of that group for which it is responsible and is logically connected to every other network node within this group. In the example, the network node A.1 will thus be assumed to be physically connected to the network node A.1.1 and logically connected to the network nodes A.1.2 and A.1.3, and for example the network node A will be assumed to be physically connected to the network node A.1 and logically connected to the network nodes A.2, A.3 and A.4. Furthermore, every network node of a higher network level is to be logically connected to every other network node (A.2, A.3, A.4) of the group (PGA) to which it itself belongs. Thus in the example the network node A.1 is connected to the network nodes A.2, A.3 and A.4 and the network node A is connected to the network nodes B and C. The connections within the network level are again shown by continuous lines but bear no references.

A logic connection between two network nodes consists of a plurality of physical connections interconnected via the intermediary of an intervening network node in a switched mode each. This is generally effected by means of permanent virtual paths.

In general a network node of a higher network level is also at least physically connected to that network node of a lower network level with which it has a physical connection. Normally the connection extends further, for example in that data banks or servicing and maintenance devices are jointly employed or are physically identical and at best are working logically separated.

It should also be noted that, in contrast to other hierarchically constructed networks, only the lower network level is used for the actual physical data exchange; the higher network levels serve exclusively for the administration of the network and may carry signalling information, here especially connection data.

In order now to be able to establish connections between network nodes, and in particular to establish connections between end subscribers connected to the networks nodes, those network nodes from which such connections can emanate must also be able to access the required connection data. For this purpose, in the prior art a data bank in which the connection data for the entire communications network are kept available is provided in each of these network nodes, i.e. in all the network nodes of the lowest network level. The respective superordinate network nodes are responsible for the maintenance of these connection data.

However, in the approach according to the prior art, in large networks very large quantities of data must be stored and also continuously maintained.

In accordance with the invention, not all the data are stored everywhere, and in fact only the connection data for a closer environment are stored in each data bank assigned to a network node of the lowest network level. Then, however, in each such closer environment an additional data bank must be provided which contains connection data leading out of this closer environment into a wider environment.

In the example, the group in question is defined as the closer environment.

Therefore an additional data bank RSA1, . . . , RSC is provided within each group PGA1, . . . , PGC of the lowest network level L1. Each of this additional data banks is assigned to a network node.

The network nodes A.4.1, A.4.2, A.4.3, A.4.4 and A.4.5 are combined for example in the group PGA4. These each comprise a data bank containing the connection data for all possible connections between these five network nodes. Each of these data banks also contains the information that further connection data can be called up in a data bank RSA4 associated with the network node A.4.4.

The data bank RSA4, which can form a unit with the data bank of the network node A.4.4, contains all the other connection data for the entire communications network.

If, for example, a connection is to be established from the network node A.4.2, this node firstly checks whether the destination is situated within the group PGA4 or not. If so, this network node calls up the corresponding connection data from its own data bank and thus establishes the connection. The connection establishment takes place through the exchange of signalling data, generally via connections already constructed as signalling channels. When a connection is established (this also applies to signalling channels), the data exchange takes place via this connection such that the data to be exchanged are packaged together with path information in data packets and thus dispatched. The path information contains stage destinations which are contacted en route and at which the data packets can be routed on to the next stage. This path information is the same for all the data packets of a connection (excepting reactions to faults or the like) and upon the establishment of the connection is determined from the connection data following confirmation by the respective opposite terminals.

The terms "connection data" and "path information" will now be briefly defined in terms of how they are to be understood in this context (independently of a possible different definition of these terms): All data descriptive of the communications network and its characteristics, independently of a concrete individual application, are referred to as "connection data". This comprises in particular data relating to the existence of lines in the widest sense and their capacity. "Path information" refers to the data required to facilitate the switching of the data packets of a concrete ATM connection (also of a signalling connection) from a source network node to a destination network node.

If, in the example commenced in the foregoing, the destination is situated outside the group PGA4, the network node A.4.2 calls up from its own data bank the information that further connection data can be called up via the network node A.4.4 from the data bank RSA4, and through the exchange of signalling data calls up the required further connection data in order thus to establish the required connection. The process of calling up further connection data from the data bank RSA4 takes place so frequently that it may be only insubstantially more complex than the calling up of connection data from the data bank belonging to the network node A.4.2.

For practical considerations, this rigid scheme is often deviated from. Thus, in its own data bank, each network node will also additionally store and call up connection data for those connections which are frequently required. For example the network node A.4.5 will not need to call up the data bank RSA4 via the network node A.4.4 to discover that it itself has a direct connection to the network node A.1.1. Permanent virtual paths are also preferably preset for frequently required connections so that no detailed connection data are needed for this purpose. Such permanent virtual paths can be entered in the data banks like actually physically existing paths.

As the path information for concrete ATM connections need not necessarily initially designate all the network nodes via which the particular ATM connection proceeds, detailed information being required only in the course of the path, it is also sufficient for the connection data to be known only to this extent at the start of the path. For example, for a connection from the network node A.4.3 to the network node C.2 it is sufficient to be able to determine, in the network node A.4.3, that the connection within the group PGA4 must pass through the network nodes A.4.2 and A.4.5, from where it proceeds across the groups PGA1, PGA2 and PGA3 into the region of the group PGB and on into the region of the group PGC. At the boundary to the particular next group it is then always necessary to determine the ongoing path. Each group is of course represented by the corresponding network node. The connection from the network node A.4.3 to the network node C.2 is thus characterised by the information that it is necessary to pass in turn through the regions of the network nodes A.4.2, A.4.5, A.1, A.2, A.3, B and C with the destination C.2. The information must then be redefined within the individual regions.

The idea of differentiating between closer and wider environments can also be expressed hierarchically. Thus the region of the group PGA can be considered as the closer region for the additional data banks RSA1, RSA2, RSA3 and RSA4, and the region of the group PGB can be considered as closer region for the additional data banks RSB1 and RSB2. In each of these groups it is again necessary to provide an additional data bank containing connection data relating to a wider environment for this group, preferably the entire communications network. In very large networks, further hierarchical levels can also be set up for the additional data banks. The drawing does not illustrate such further hierarchical levels or additional data banks in higher hierarchical levels.

As the network nodes of the higher network levels ultimately coincide with network nodes of the lower network level, the additional data banks of the higher network levels are also preferably linked with additional data banks of the lower network level. For example, the data banks RSA3 can contain connection data for the region of the group PGA as additional data bank for the group PGA3 and can contain connection data for the entire communications network as additional data bank for the group PGA. Similar can also apply to the additional data bank RSB2.

In the example of this last mentioned data bank RSB2, the protection of the data can also briefly be discussed. In subordinate network nodes, by way of data protection in some cases it can suffice merely to create back-up copies which are manually retrieved in the event of a fault. Mere duplication of the data in the particular adjacent network node results in simplified handling; protection by means of a data bank serving exclusively for back-up can constitute a further measure, as in the case of the example in which the additional data bank RSB2' of the network node B.2.5 is shown as duplicate of the additional data bank RSB2 of the network node B.2.1. The mutual back-up of two data banks, for example the additional data banks RSA3 and RSA4, achieves the same objective however.

It can easily be seen that when the connection data are hierarchically distributed, their maintenance can also take place in a hierarchical structure. Thus each network node is responsible for providing that it itself, and possibly all the network nodes for which it is responsible, receive(s) all the connection data to be modified, and store(s) these data in the respective data bank. Naturally only the modified connection data which is actually to be stored in the respective data bank need be stored in modified form.

Here it is immaterial whether the modifications are forwarded from the location at which the modification takes place or whether interrogations relating to modifications are made periodically in accordance with a rule of some kind.

As each network node is anyhow automatically computer-controlled and comprises means of communicating with the other network nodes, the means suitable and required for the implementation of this data maintenance consist merely of the program parts required for the control.

The means (program parts) for the implementation of the data maintenance, as well as the means (program parts) by which these (connection) data are called up or output upon request, generally comprise not only simple control steps but also steps for addressing, identification and data protection.

Figure 2:
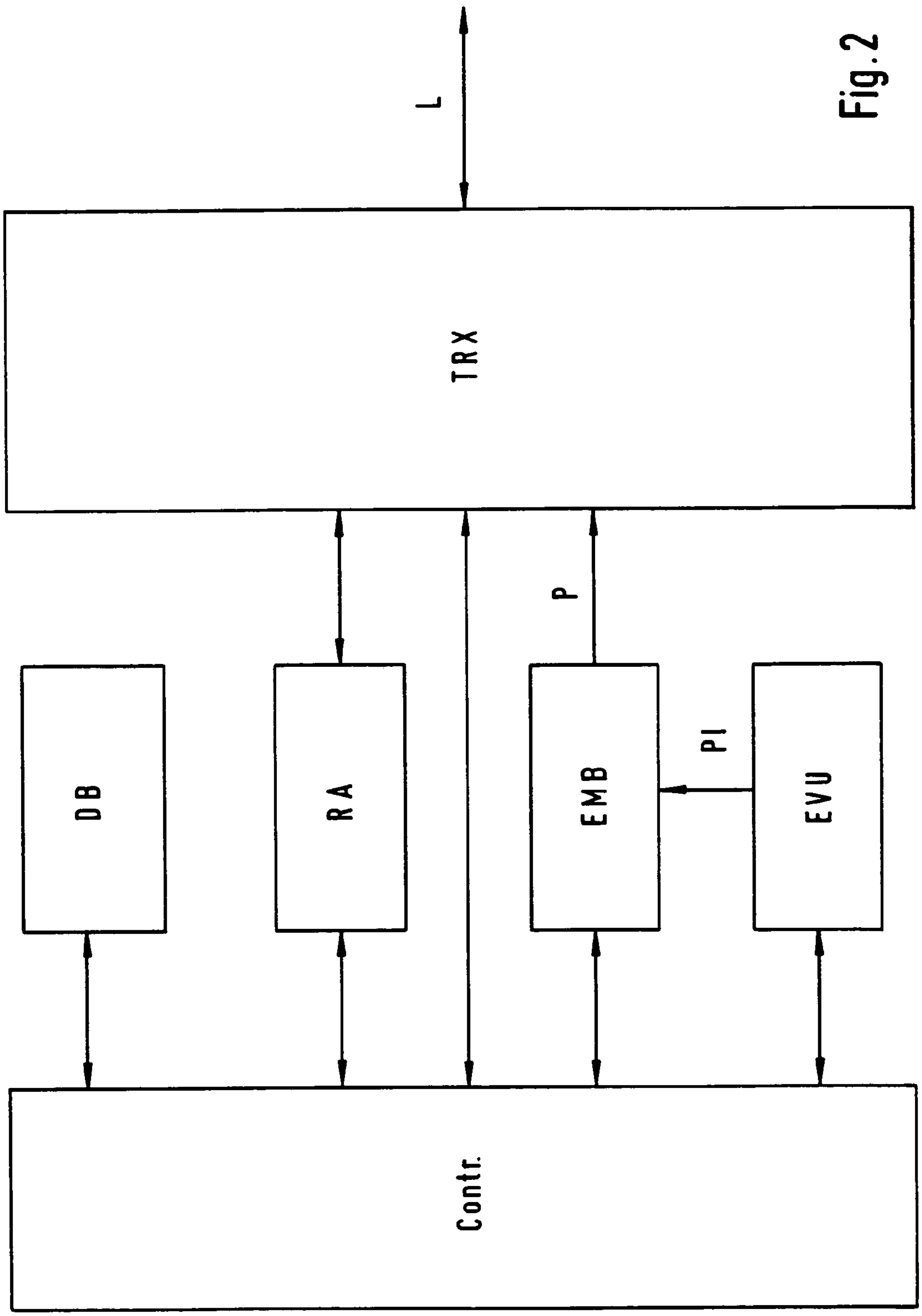

Merely by way of an example, a possible simple construction of a network node according to the invention will be described with reference to FIG. 2. Such a network node comprises a control unit Contr, a data bank DB, an interrogation and response unit RA, an embedding unit EMB, an evaluating unit EVU and a transmitting and receiving unit TRX. The network node is connected to the rest of the communications network via at least one data connection L.

The control unit Contr controls all the other units of the network node including the data bank and for this purpose can exchange data and commands bidirectionally with all the units.

The data bank DB contains i.a. all the connection data for the region for which this network node is responsible. Depending upon the task in question, this can comprise only a closer environment, only a wider environment, or both.

The interrogation and response unit RA calls up connection data from other network nodes or responds to interrogations from other network nodes. The data maintenance also takes place via this unit.

The embedding unit EMB links data to be transmitted with an item of path information PI to form a data packet P.

The evaluating unit EVU evaluates connection data from received or stored information and from this makes available the path information for the individual data packets P.

The transmitting and receiving unit TRX forms the interface to the rest of the communications network.

The basic construction of a network node is ultimately the same in all the described situations; only the functions and data stored in the data bank differ.

The measures according to the invention thus facilitate an efficient operation both of smaller, and also in particular larger, communications networks of the described type.

What is claimed is:

1. A communications network for exchanging data packets of ATM connections, which is hierarchically constructed, the communications network comprising:

a lowest network level having a plurality of network nodes, the plurality of lowest network level network nodes are each directly or indirectly connected, by at least one possible physical path, to terminal devices and to every other network node of the lowest network level; and higher network levels having network nodes, the higher network level network nodes each are administratively responsible for a group of network nodes situated in an underlying lower network level, wherein each network node situated in one of the higher network levels is physically connected to at least one network node and logically connected to every other network node, of the group of network nodes situated in the underlying lower network level for which the higher network level network node is responsible, wherein the higher network level network node is physically or logically connected to every other network node of a group of higher network level network nodes to which the higher network level network node itself belongs, wherein each higher network level network node provides each network node of a lower network level for which each higher network level network node is responsible, connection data which the lower network level network node requires to determine path information for the data packets of a concrete ATM connection in the communications network, and further comprising a data bank, in which connection data are kept available, arranged in each network node of the lower network level, wherein the data bank in each lower network level network node keeps available connection data for a closer environment, the closer environment defining network nodes in one group, wherein at least one additional data bank, which keeps available connection data for a wider environment, is provided and assigned to a network node of the lower network level, the wider environment defining all network nodes and groups of network nodes, and wherein a network node of a higher network level, which is responsible for the network node to which the at least one additional data bank is assigned, also comprises means for maintaining the connection data in the additional data bank.

2. A method for making connection data available for determining path information for data packets of ATM connections in a communications network which is hierarchically constructed such that in a lowest network level, a plurality of network nodes are provided and each are connected directly or indirectly, by at least one possible physical path, to terminal devices and to every other network node of the lowest network level, and in higher network levels, network nodes are provided, the higher network level network nodes each are administratively responsible for a group of network nodes situated in an underlying lower network level, and each network node situated in a higher network level is physically connected to at least one network node and logically connected to every other network node of the group of network nodes situated in the underlying lower network level for which the higher network level network node is responsible, and is physically or logically connected to every other network node of a group of higher network level network nodes to which the higher network level network node itself belongs, the method comprising:

providing, when necessary, connection data, from a higher network level network node to a lower network level network node, the connection data for determining path information for the data packets of a concrete ATM connection, wherein lower network level connection data are kept available in a data bank, wherein the data bank in a network node of a lower network level keeps available connection data for a closer environment, the closer environment defining network nodes in one group, wherein at least one additional data bank, which keeps available connection data for a wider environment, is accessible to and assigned to a network node of the lower network level, the wider environment defining all network nodes and groups of network nodes, and wherein a network node of a higher network level, which is responsible for a network node to which the at least one additional data bank is assigned, is also responsible for maintaining the connection data in the at least one additional data bank.

3. A method for determining path information for data packets of ATM connections in a network node of a communications network which is hierarchically constructed such that in a lowest network level, a plurality of network nodes are provided and each are connected directly or indirectly, by at least one possible physical path, to terminal devices and to every other network node of the lowest network level, and in higher network levels, network nodes are provided, the higher network level network nodes each are administratively responsible for a group of network nodes situated in an underlying lower network level, and each network node situated in a higher network level is physically connected to at least one network node and logically connected to every other network node of the group of network nodes situated in the underlying lower network level, for which the higher network level network node is responsible, and is physically or logically connected to every other network node of a group of network nodes situated in the higher network level to which the higher network level network node itself belongs, the method comprising:

requesting connection data from a data bank assigned to a lower network level network node, wherein, if the requested connection data is not available from the data bank assigned to the lower network level network node, the connection data is requested from an additional data bank which is assigned to another lower network level network node.

4. Network nodes for a lower network level of a communications network, which is hierarchically constructed, such that in a lowest network level a plurality of network nodes are provided and each are connected directly or indirectly, by at least one possible physical path, to terminal devices and to every other network node of the lower network level, and in higher network levels, network nodes are provided, the higher network level network nodes each are administratively responsible for a group of network nodes situated in an underlying lower network level, each network node situated in a higher network level is physically connected to at least one network node and logically connected to every other network node of the group of network nodes situated in the underlying lower network level for which the higher network level network node is responsible, and is physically or logically connected to every other network node of a higher network level group to which the higher network level network node itself belongs, the lower network level network node comprising:

a data bank provided in which connection data are kept available, wherein the data bank keeps available connection data for a closer environment, the closer environment defining network nodes in one group, and wherein the network node comprises interrogation means by which the connection data for a wider environment can be called up from an additional data bank which is assigned to another lower network level network node, the wider environment defining all network nodes and groups of network nodes.

5. A network node for a lower network level of a communications network, which is hierarchically constructed, such that in a lowest network level, a plurality of network nodes are provided and each are connected directly or indirectly, by at least one possible physical path, to terminal devices and to every other network node of the lowest network level, and in higher network levels, network nodes are provided, the higher network level network nodes each are administratively responsible for a group of network nodes situated in an underlying lower network level, and each network node situated in a higher network level is physically connected to at least one network node and logically connected to every other node of the group of network nodes situated in the underlying lower network level for which the higher network level network node is responsible and is physically or logically connected to every other network node of a group of higher network level network nodes to which the higher network level network node itself belongs, the lower network level network node comprising:

a data bank in which connection data are kept available, wherein an additional data bank, which keeps available connection data for a wider environment, is provided and is assigned to the lower network level network node or connected to the data bank provided in the lower network level network node, and wherein the lower network level network node further comprises means whereby connection data from the at least one additional data bank can be emitted to other network nodes upon request.

6. A communications network according to claim 1, wherein the lower network level, whose network nodes each are provided with a data bank in which connection data for a closer environment are kept available, is the lowest network level.

7. A communications network according to claim 6, wherein the closer environment is a region of the group to which the respective lower network level network node belongs.

8. A communications network according to claim 7, wherein at least one additional data bank is provided in each of a plurality of groups of network nodes of the lowest network level.

* * * * *